(12) United States Patent
Zheng et al.

(10) Patent No.: US 8,054,650 B2
(45) Date of Patent: Nov. 8, 2011

(54) SWITCHING POWER SUPPLY CIRCUIT AND DRIVING METHOD THEREOF

(75) Inventors: Jie-Jian Zheng, Shenzhen (CN); Tong Zhou, Shenzhen (CN)

(73) Assignees: Innocom Technology (ShenZhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 424 days.

(21) Appl. No.: 12/386,617

(22) Filed: Apr. 20, 2009

(65) Prior Publication Data

US 2009/0262558 A1 Oct. 22, 2009

(30) Foreign Application Priority Data

Apr. 18, 2008 (TW) .............................. 97114231 A

(51) Int. Cl.
*H02M 3/335* (2006.01)
(52) U.S. Cl. ......................................................... 363/16
(58) Field of Classification Search .................... 363/16, 363/18, 21.06, 21.14, 127
See application file for complete search history.

(56) References Cited

U.S. PATENT DOCUMENTS 3,764,881 A * 10/1973 Thomas .......................... 363/19
5,138,543 A 8/1992 Harm et al.
5,844,792 A * 12/1998 Moreau ........................... 363/89

FOREIGN PATENT DOCUMENTS

CN 2572664 Y 9/2003
* cited by examiner

*Primary Examiner* — Shawn Riley
(74) *Attorney, Agent, or Firm* — Altis Law Group, Inc.

(57) ABSTRACT

A switching power supply circuit includes a direct current (DC) power supply input, a first transistor, a capacitor, a first resistor, a second resistor, a switching circuit including a second transistor, and a first transformer including a first primary winding and a secondary winding. The DC power supply input is connected to a drain electrode of the first transistor via the capacitor. A gate electrode of the first transistor is connected to ground via the first resistor, and connected to the drain electrode of the first transistor via the second resistor. The DC power supply input is connected to a source electrode of the first transistor via the primary winding. The source electrode of the first transistor is grounded via the second transistor. The secondary winding is structured and arranged to drive a load circuit.

19 Claims, 3 Drawing Sheets

SWITCHING POWER SUPPLY CIRCUIT AND DRIVING METHOD THEREOF

BACKGROUND

1. Technical Field

The present disclosure relates to a switching power supply circuit and a method for driving a switching power supply circuit.

2. Description of Related Art

Switching power supply circuits, exhibiting superior linear characteristics, consuming minimum power, converting electrical power efficiently, and performing steadily, are preferred for use in LCD TVs, displays, and other consumer devices.

FIG. 3 shows a commonly used switching power supply circuit. The switching power supply circuit 10 includes a first rectifying and filtering circuit 11, a snubber circuit 13, a transformer 14, a second rectifying and filtering circuit 12, a switching circuit 15, and a rectifying diode 16. The switching circuit 15 includes a pulse width modulation integrated circuit (PWM IC) 151, a transistor 152, and a resistor 155. The PWM IC 151 includes a voltage input 153 for receiving an operating voltage, and a pulse output 154 for transmitting a generated pulse signal to a gate electrode of the transistor 152.

The first rectifying and filtering circuit 11 includes two inputs 113, 114 structured and arranged to receive an external alternating current (AC) voltage such as a 220V AC voltage, a full-bridge rectifying circuit 111 structured and arranged to convert the 220V AC voltage to a first direct current (DC) voltage, a first filtering capacitor 112 structured and arranged to stabilize the first DC voltage, and a first output 115 structured and arranged to provide the first DC voltage to the transformer 14. Two inputs of the full-bridge rectifying circuit 111 serve as the two inputs 113, 114. A positive output of the full-bridge rectifying circuit 111 serves as the first output 115. A negative output of the full-bridge rectifying circuit 111 is grounded. The first filtering capacitor 112 is connected between the first output 115 and ground.

The transformer 14 includes a primary winding 141, an auxiliary winding 142, and a secondary winding 143. The primary winding 141 is electrically connected in parallel with the snubber circuit 13. One terminal "a" of the primary winding 141 is connected to the first output 115, and the other terminal "b" of the primary winding 141 is connected to a drain electrode of the transistor 152. A source electrode of the transistor 152 is grounded via the resistor 155. The gate electrode of the transistor 152 is connected to the pulse output 154 of the PWM IC 151.

One terminal of the auxiliary winding 142 is grounded. The other terminal of the auxiliary winding 142 is connected to the voltage input 153 of the PWM IC 151 via an anode and a cathode of the rectifying diode 16 in series.

The second rectifying and filtering circuit 12 includes an inductor 121, a storage capacitor 122, a second filtering capacitor 123, a rectifying diode 124, and a second output 125. One terminal "c" of the secondary winding 143 is connected to the second output 125 via an anode and a cathode of the rectifying diode 124 and the inductor 121 in series. The other terminal "d" of the secondary winding 143 is grounded. The second filtering capacitor 123 is connected between the second output 125 and ground. The storage capacitor 122 is connected between the cathode of the rectifying diode 124 and ground.

The switching power supply circuit 10 operates as follows:

The external AC voltage is provided to the two inputs 113, 114 of the first rectifying and filtering circuit 11, and is converted to the first DC voltage by the first rectifying and filtering circuit 11. The first DC voltage is provided to the primary winding 141. The auxiliary winding 142 is induced by the primary winding 141, generates an operating voltage, and provides the operating voltage to the voltage input 153 of the PWM IC 151 via the rectifying diode 16. Thus the PWM IC 151 generates the pulse signal for switching the transistor 152 on or off.

When the transistor 152 is switched on, a first current path is formed sequentially through the first output 115, the primary winding 141, the transistor 152, and the resistor 155. A first current I is formed when the first DC voltage provided to the first output 115 is connected to ground via the first current path. The first current I through the first current path increases linearly until electromagnetic induction generated in the primary winding 141 reaches a predetermined maximum threshold. Thus a voltage across the primary winding 141 is generated such that a potential of the terminal "a" is higher than that of the terminal "b". The secondary winding 143 is induced by the increasing first current I to generate a first induced voltage such that a potential of the terminal "c" is higher than that of the terminal "d". The rectifying diode 124 and the inductor 121 convert the first induced voltage to a second DC voltage, and provide the second DC voltage to a load circuit (not shown) via the second output 125.

When the transistor 152 is switched off, the snubber circuit 13 gradually absorbs and decreases the first current I. The secondary winding 143 is induced by the decreasing first current I to generate a second induced voltage such that the potential of the terminal "d" is higher than that of the terminal "c". Thus the rectifying diode 124 is switched off, and no voltage is outputted from the second output 125.

The switching power supply circuit 10 does not utilize the decreasing first current I to generate the second DC voltage when the transistor 152 is switched off and the first current I is absorbed by the snubber circuit 13. Thus, the switching power supply circuit 10 lacks efficiency.

It is thus desirable to provide a switching power supply circuit which can overcome the described limitations.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout the various views.

DETAILED DESCRIPTION

Reference will now be made to the drawings to describe various inventive embodiments of the present disclosure in detail, wherein like numerals refer to like elements throughout.

Figure 1:
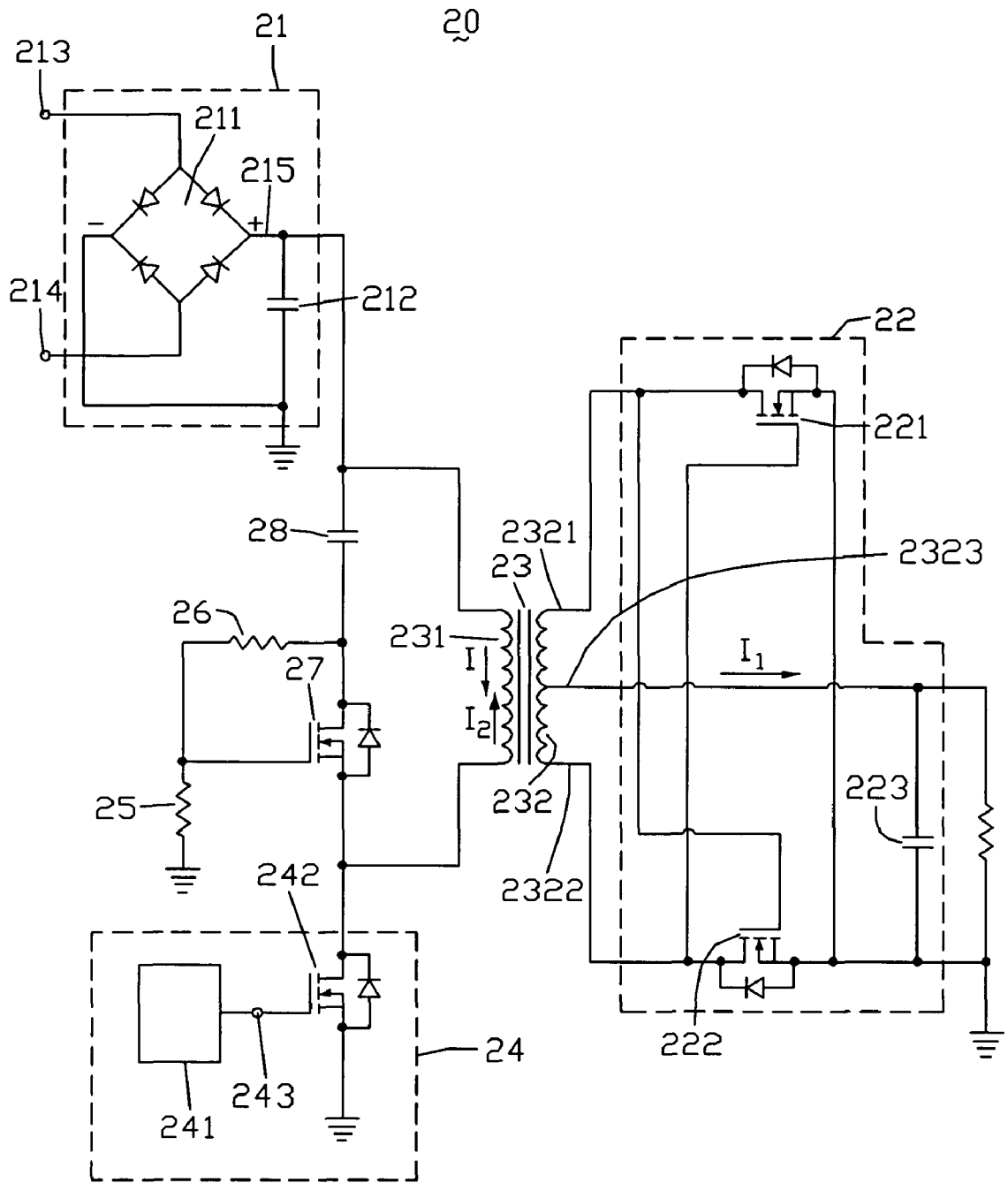
FIG. 1 is a diagram of a switching power supply circuit according to a first embodiment of the present invention.

FIG. 1 is a diagram of a switching power supply circuit according to a first embodiment of the present invention. The switching power supply circuit 20 includes a first rectifying and filtering circuit 21, a second rectifying and filtering circuit 22, a transformer 23, a switching circuit 24, a first resistor 25, a second resistor 26, a first transistor 27, and a capacitor 28. The switching circuit 24 includes a PWM IC 241 and a second transistor 242. The PWM IC 241 includes a pulse output 243 for transmitting a generated pulse signal to a gate electrode of the second transistor 242.

The first rectifying and filtering circuit 21 includes two inputs 213, 214 structured and arranged to receive an external AC voltage such as a 220V AC voltage, a full-bridge rectifying circuit 211 structured and arranged to convert the 220V AC voltage to a first DC voltage, a first filtering capacitor 212 structured and arranged to stabilize the first DC voltage, and a first output 215 structured and arranged to provide the first DC voltage to the transformer 23. Two inputs of the full-bridge rectifying circuit 211 serve as the two inputs 213, 214. A positive output of the full-bridge rectifying circuit 21 serves as the first output 215. A negative output of the full-bridge rectifying circuit 21 is grounded. The first filtering capacitor 212 is connected between the first output 215 and ground. The first rectifying and filtering circuit 21 can be considered as a DC power supply input with respect to a remainder of the switching power supply circuit 20.

The transformer 23 includes a primary winding 231 and a secondary winding 232. The secondary winding 232 includes a first terminal 2321, a second terminal 2322, and a central tap terminal 2323. The first output 215 is connected to a drain electrode of the second transistor 242 via two routes. The first route is via the capacitor 28 and a drain electrode and a source electrode of the first transistor 27 in series, and the second route is via the primary winding 231. A gate electrode of the first transistor 27 is grounded via the first resistor 25, and is connected to the drain electrode of the first transistor 27 via the second resistor 26. A source electrode of the second transistor 242 is grounded. The gate electrode of the second transistor 242 is connected to the pulse output 243 of the PWM IC 241.

The second rectifying and filtering circuit 22 includes a third transistor 221, a fourth transistor 222, and a second filtering capacitor 223. The first terminal 2321 is grounded via drain and source electrodes of the third transistor 221 in series. The second terminal 2322 is grounded via drain and source electrodes of the fourth transistor 222 in series. The central tap terminal 2323 is grounded via the second filtering capacitor 223. A gate electrode of the third transistor 221 is connected to the second terminal 2322. A gate electrode of the fourth transistor 222 is connected to the first terminal 2321.

The switching power supply circuit 20 typically operates as follows:

External AC voltage is provided to the two inputs 213, 214 of the first rectifying and filtering circuit 21, and is converted to a 310V first DC voltage by the first rectifying and filtering circuit 21. The first DC voltage is provided to the primary winding 231 by the first output 215.

When the PWM IC 241 provides the pulse signal to switch on the second transistor 242, a first current path is formed sequentially through the first output 215, the primary winding 231, and the activated second transistor 242. A first current I is generated when the first DC voltage provided to the first output 215 is connected to ground via the first current path. The first current I through the first current path increases linearly until electromagnetic induction generated in the primary winding 231 reaches a predetermined maximum threshold.

The secondary winding 232 is induced by the increasing first current I to generate a first induced voltage, such that a potential of the first terminal 2321 is lower than that of the central tap terminal 2323, and a potential of the second terminal 2322 is higher than that of the central tap terminal 2323. Thus, the third transistor 221 switches on and the fourth transistor 222 switches off, and a second current path is formed sequentially via the first terminal 2321, the filtering capacitor 223, and the activated third transistor 221. As a result, a second current $I_1$ through the second current path is generated, as shown in FIG. 1. A second DC voltage outputted from the central tap terminal 2323 is filtered by the filtering capacitor 223 and drives a load circuit such as a resistor (not labeled).

When the PWM IC 241 provides the pulse signal to switch off the second transistor 242, the first current I flows through a parasitic diode (not labeled) of the first transistor 27 to charge the capacitor 28 until a voltage across the parasitic diode of the first transistor 27 is less than a predetermined conductive voltage. At the same time, a potential of the drain electrode of the first transistor 27 is gradually increased, with the capacitor 28 being charged until a voltage difference between the gate and the source electrodes of the first transistor 27 reaches a switching on voltage. When the first transistor 27 switches on, the capacitor 28 discharges via the activated first transistor 27 and the primary winding 231 to form a third current $I_2$. The third current $I_2$ has a direction the reverse of that of the first current I, as shown in FIG. 1.

The secondary winding 232 is induced by the increasing third current $I_2$ to generate a second induced voltage, such that a potential of the first terminal 2321 is higher than that of the central tap terminal 2323, and a potential of the second terminal 2322 is lower than that of the central tap terminal 2323. Thus the third transistor 221 switches off and the fourth transistor 222 switches on, and a third current path is formed sequentially via the second terminal 2322, the activated fourth transistor 222, and the filtering capacitor 223. As a result, the second current $I_1$ through the third current path is generated, as shown in FIG. 1. The second DC voltage outputted from the central tap terminal 2323 is filtered by the filtering capacitor 223 and drives the load circuit such as the resistor (not labeled).

Because the switching power supply circuit 20 includes the capacitor 28 and the first transistor 27, the second DC voltage can be generated and provided to the load circuit even when the second transistor 242 is switched off. Thus the switching power supply circuit 20 is efficient.

Figure 2:
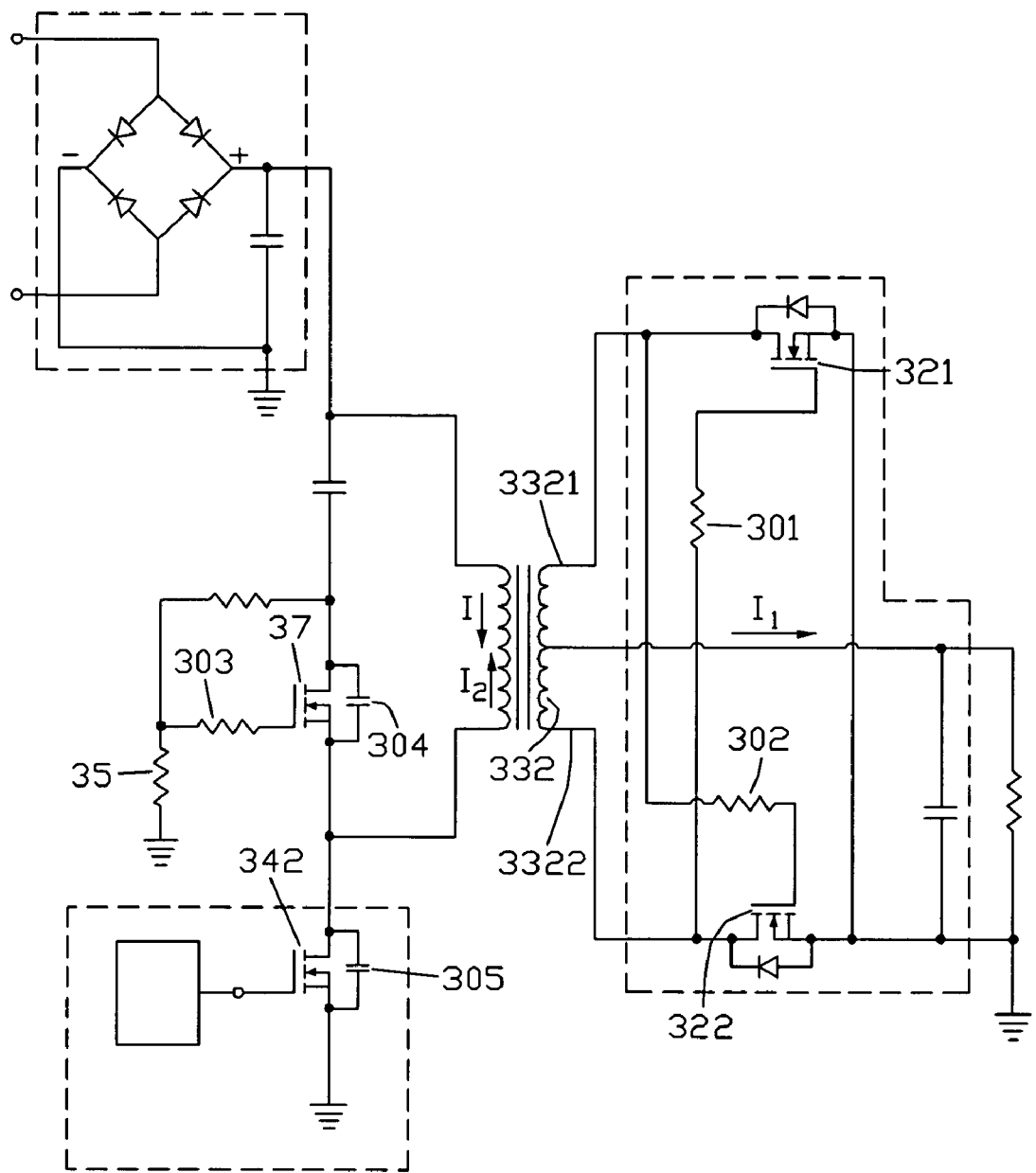
FIG. 2 is a diagram of a switching power supply circuit according to a second embodiment of the present invention.
Figure 3:
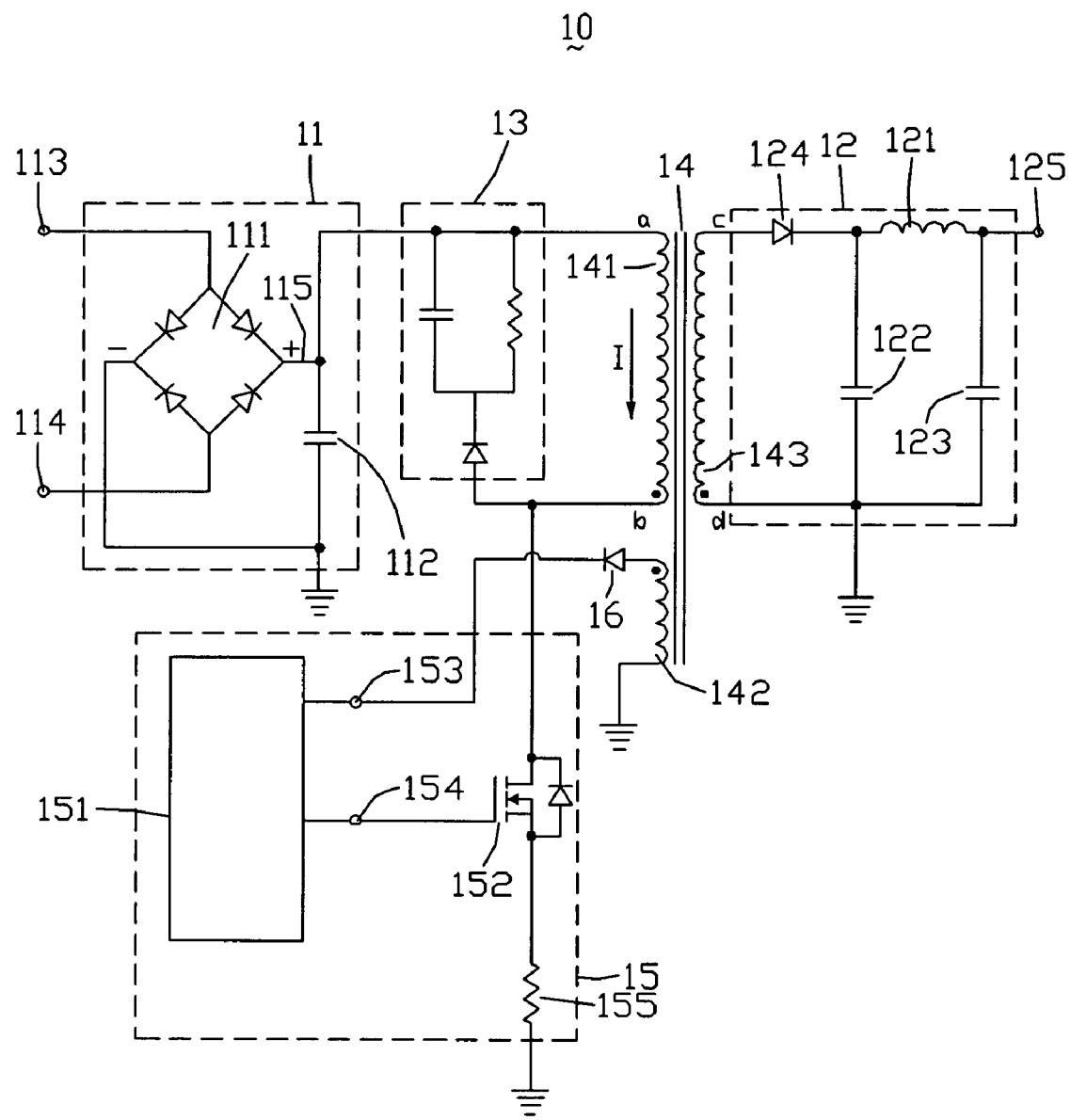
FIG. 3 is a diagram of a frequently used switching power supply circuit.

FIG. 2 is a diagram of a switching power supply circuit according to a second embodiment of the present invention. The switching power supply circuit 30 is similar to the switching power supply circuit 20, except that the switching power supply circuit 30 further includes a first current limiting resistor 301, a second current limiting resistor 302, a third current limiting resistor 303, a second capacitor 304, and a third capacitor 305. A gate electrode of a first transistor 37 is grounded via the third current limiting resistor 303 and a first resistor 35 in series. A gate electrode of a third transistor 321 is connected to a second terminal 3322 of a secondary winding 332 via the first current limiting resistor 301. A gate electrode of a fourth transistor 322 is connected to a first terminal 3321 of the secondary winding 332 via the second current limiting resistor 302. The second capacitor 304 is connected between drain and source electrodes of the first transistor 37. The third capacitor 305 is connected between drain and source electrodes of a second transistor 342. The second and the third capacitors 304, 305 function as protection units.

In the illustrated embodiments, the first, second, third and fourth transistors 27, 37, 242, 342, 221, 321, 222, 322 are n-channel metal-oxide-semiconductor field-effect transistors (N-MOSFETs). In other embodiments, other switching units having three terminals can instead be employed.

It is to be further understood that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of the present invention to the full extent indicated by the broad general meaning of the terms in which the appended claims are expressed.

The invention claimed is:

1. A switching power supply circuit comprising:
a direct current (DC) power supply input;
a first transistor, a capacitor, a first resistor, and a second resistor, the DC power supply input being connected to a drain electrode of the first transistor via the capacitor, a gate electrode of the first transistor capable of being grounded via the first resistor and connected to the drain electrode of the first transistor via the second resistor;
a switching circuit comprising a second transistor; and
a first transformer comprising a primary winding and a secondary winding, the DC power supply input being connected to a source electrode of the first transistor via the primary winding, the source electrode of the first transistor capable of being grounded via the second transistor, and the secondary winding structured and arranged to drive a load circuit.

2. The switching power supply circuit of claim 1, further comprising a first rectifying and filtering circuit structured and arranged to receive an external alternating current (AC) voltage and convert the AC voltage to a first DC voltage.

3. The switching power supply circuit of claim 2, wherein the first rectifying and filtering circuit comprises two inputs structured and arranged to receive the external AC voltage, a full-bridge rectifying circuit, and a first filtering capacitor, wherein the two inputs of the full-bridge rectifying circuit serve as the two inputs, a positive output of the full-bridge rectifying circuit serve as the DC power supply input, a negative output of the full-bridge rectifying circuit is capable of being grounded, and the first filtering capacitor is capable of connecting between the DC power supply input and ground.

4. The switching power supply circuit of claim 1, wherein the first and the second transistors are n-channel metal-oxide-semiconductor field-effect transistors (N-MOSFETs).

5. The switching power supply circuit of claim 1, wherein the switching circuit further comprises a pulse width modulation integrated circuit (PWM IC) configured for generating a pulse signal to switch the second transistor on or off.

6. The switching power supply circuit of claim 1, further comprising a second rectifying and filtering circuit structured and arranged to rectify and filter an alternating current (AC) voltage from the secondary winding into a DC voltage.

7. The switching power supply circuit of claim 6, wherein:
the secondary winding comprises a first terminal, a second terminal, and a central tap terminal; and
the second rectifying and filtering circuit comprises a third transistor, a fourth transistor, and a second filtering capacitor;
wherein the first terminal is capable of being grounded via drain and source electrodes of the third transistor in series,
the second terminal is capable of being grounded via drain and source electrodes of the fourth transistor in series,
the central tap terminal is capable of being grounded via the second filtering capacitor,
a gate electrode of the third transistor is connected to the second terminal, and
a gate electrode of the fourth transistor is connected to the first terminal.

8. The switching power supply circuit of claim 7, further comprising a first current limiting resistor, the gate electrode of the third transistor being connected to the second terminal of the secondary winding via the first current limiting resistor.

9. The switching power supply circuit of claim 7, further comprising a second current limiting resistor, the gate electrode of the fourth transistor being connected to the first terminal of the secondary winding via the second current limiting resistor.

10. The switching power supply circuit of claim 1, further comprising a third current limiting resistor, the gate electrode of the first transistor capable of being grounded via the third current limiting resistor and the first resistor in series.

11. The switching power supply circuit of claim 1, further comprising a second capacitor connected between the drain and the source electrodes of the first transistor.

12. The switching power supply circuit of claim 1, further comprising a third capacitor connected between the drain and the source electrodes of the second transistor.

13. A driving method for a switching power supply circuit, the method comprising:
providing a direct current (DC) power supply input;
providing a first transistor, a capacitor, a first resistor, and a second resistor, the DC power supply input being connected to a drain electrode of the first transistor via the capacitor, a gate electrode of the first transistor being grounded via the first resistor and connected to the drain electrode of the first transistor via the second resistor;
providing a switching circuit comprising a second transistor;
providing a first transformer comprising a primary winding and a secondary winding, the DC power supply input being connected to a source electrode of the first transistor via the primary winding, the source electrode of the first transistor being grounded via the second transistor, and the secondary winding structured and arranged to drive a load circuit;
generating a first current through the primary winding when the second transistor is switched on, and generating an induced voltage across the secondary winding;
charging the capacitor by the first current through a parasitic diode of the first transistor when the second transistor is switched off;
discharging the capacitor thereby generating a second current through the primary winding with a direction reverse to that of the first current when the first transistor is switched on and the second transistor is switched off, and generating the induced voltage across the secondary winding; and
rectifying and filtering the induced voltage across the secondary winding into a DC voltage for driving a load circuit.

14. The driving method of claim 13, wherein providing the DC power supply input comprises providing a first rectifying and filtering circuit, and the method further comprises the first rectifying and filtering circuit receiving an external alternating current (AC) voltage, converting the AC voltage to a DC voltage, and outputting the DC voltage.

15. The driving method of claim 14, wherein the first rectifying and filtering circuit comprises two inputs structured and arranged to receive the external AC voltage, a full-bridge rectifying circuit, and a first filtering capacitor, wherein the two inputs of the full-bridge rectifying circuit serve as two inputs of the DC power supply input, a positive output of the full-bridge rectifying circuit serves as an output of the DC power supply input, a negative output of the full-bridge rectifying circuit is grounded, and the first filtering capacitor is connected between the positive output of the full-bridge rectifying circuit and ground.

16. The driving method of claim 13, wherein the first and the second transistors are n-channel metal-oxide-semiconductor field-effect transistors (N-MOSFETs).

17. The driving method of claim 13, wherein the switching circuit further comprises a pulse width modulation integrated circuit (PWM IC), and the method further comprises the PWM IC generating a pulse signal to switch the second transistor on, and generating a pulse signal to switch the second transistor off.

18. The driving method of claim 13, wherein further comprising providing a second rectifying and filtering circuit structured and arranged to rectify and filter the induced voltage across the secondary winding into a DC voltage.

19. The driving method of claim 18, wherein:
the secondary winding comprises a first terminal, a second terminal, and a central tap terminal; and
the second rectifying and filtering circuit comprises a third transistor, a fourth transistor, and a second filtering capacitor;
wherein the first terminal is grounded via drain and source electrodes of the third transistor in series,
the second terminal is grounded via drain and source electrodes of the fourth transistor in series,
the central tap terminal is grounded via the second filtering capacitor,
a gate electrode of the third transistor is connected to the second terminal, and
a gate electrode of the fourth transistor is connected to the first terminal.

* * * * *